US011204146B2

(12) United States Patent
Demontoux et al.

(10) Patent No.: US 11,204,146 B2
(45) Date of Patent: Dec. 21, 2021

(54) LIGHTING DEVICE FOR VEHICLE HAVING A TRANSLUCENT ELEMENT WITH A MASK APPLIED TO INTERIOR SURFACE THEREOF

(71) Applicant: Flex-N-Gate France, Audincourt (FR)

(72) Inventors: Stéphane David Demontoux, Audincourt (FR); David Pierre Gilles Duquesnoy, Chalonvillars (FR); Thierry Receveur, Villars les Blamont (FR)

(73) Assignee: Flex-N-Gate France, Audincourt (FR)

( * ) Notice: Subject to any disclaimer, the term of this patent is extended or adjusted under 35 U.S.C. 154(b) by 0 days.

(21) Appl. No.: 17/125,112

(22) Filed: Dec. 17, 2020

(65) Prior Publication Data

US 2021/0190285 A1  Jun. 24, 2021

(30) Foreign Application Priority Data

Dec. 23, 2019 (FR) ..................... 19 15484

(51) Int. Cl.
*F21S 41/37* (2018.01)
*F21S 45/10* (2018.01)
*F21S 41/141* (2018.01)
*B60Q 1/14* (2006.01)

(52) U.S. Cl.
CPC ............ *F21S 41/37* (2018.01); *B60Q 1/1438* (2013.01); *F21S 41/141* (2018.01); *F21S 45/10* (2018.01)

(58) Field of Classification Search
CPC ..... F21S 41/141; F21S 41/40; F21Y 2115/10; F21W 41/37
See application file for complete search history.

(56) References Cited

U.S. PATENT DOCUMENTS

| 4,733,335 A | 3/1988 | Serizawa et al. |
| 5,584,566 A * | 12/1996 | Bowman ............... F21V 17/104 362/220 |
| 2015/0029718 A1* | 1/2015 | Cook ........................ F21K 9/60 362/235 |
| 2015/0291085 A1* | 10/2015 | Manning ................. F21S 43/14 362/516 |
| 2017/0327031 A1* | 11/2017 | Bauerle ............. B32B 17/10761 |

FOREIGN PATENT DOCUMENTS

| DE | 10 2012 003 200 A1 | 8/2013 |
| DE | 20 2017 103381 U1 | 8/2017 |
| DE | 10 2017 120 532 A1 | 3/2019 |
| WO | 2016/191321 A1 | 12/2016 |
| WO | 2018/186450 A1 | 10/2018 |

OTHER PUBLICATIONS

Rapport De Recherche Prèliminaire issued in corresponding French Application No. 1915484 dated Aug. 31, 2020.

* cited by examiner

*Primary Examiner* — Robert J May
(74) *Attorney, Agent, or Firm* — Troutman Pepper Hamilton Sanders LLP

(57) ABSTRACT

A lighting device for a vehicle, the lighting device having a translucent element defining an external surface and an internal surface, a mask defining an external surface and an internal surface, the mask defining a plurality of through openings, and a light source comprising at least one electronic circuit comprising a plurality of light-emitting diodes. The external surface of the mask is fixed to the internal surface of the translucent element, the light-emitting diodes of the light source being disposed opposite the internal surface of the mask.

13 Claims, 3 Drawing Sheets

LIGHTING DEVICE FOR VEHICLE HAVING A TRANSLUCENT ELEMENT WITH A MASK APPLIED TO INTERIOR SURFACE THEREOF

CROSS REFERENCE TO RELATED APPLICATION

This application claims the benefit of French Patent Application No. FR 19 15484 filed on Dec. 23, 2019, which is hereby incorporated by reference.

TECHNICAL FIELD

According to a first aspect, the present invention relates to a lighting device for a vehicle of the type comprising a translucent element defining an external surface and an internal surface, a mask defining an external surface and an internal surface, the mask defining a plurality of through openings, a light source comprising at least one electronic circuit comprising a plurality of light-emitting diodes.

The lighting device is for example a lighting device and/or a signaling device.

More particularly, the vehicle is a motor vehicle.

According to a second aspect, the invention also relates to a method of manufacturing such a lighting device.

BACKGROUND

This type of lighting device may be, for example, a daytime running light fixed to the front of the vehicle. This device allows the driver of the vehicle to be better seen by other road users during the day under normal traffic conditions.

As a variant, the lighting device may be a position light enabling the driver of the vehicle to signal his presence to other road users at night or when the visibility conditions are poor (rain, fog, poorly lit roadway, etc.).

As a further variant, the lighting device may be a flashing light allowing the driver of the vehicle to indicate his intention to change direction to other road users.

The lighting device according to the invention may also have several of the functions mentioned above.

Patent DE 10 2012 003 200 describes an example of this type of lighting device.

The mask is fixed to an external surface of the translucent element.

This has numerous drawbacks, in particular in terms of resistance over time. The mask is far too sensitive to the environment, for example to shocks, bad weather, ultraviolet radiation or pollution. These factors will gradually degrade the mask and in particular its surface appearance. Thus, this type of device requires the addition of an additional coating to protect the mask. This complicates the manufacturing method of the device and results in additional costs.

SUMMARY

An objective of the invention is to provide a lighting device forming any contrasting and homogeneous light pattern, which exhibits good resistance over time and more particularly good resistance to impacts, scratches and weathering.

To this end, the invention relates to a lighting device of the aforementioned type in which the external surface of the mask is fixed to the internal surface of the translucent element, the light-emitting diodes of the light source being disposed facing the internal surface of the mask.

Thus, since the mask is fixed to the internal surface of the translucent element, it is protected from scratches, impacts and any deterioration that would alter the aesthetic appearance of the light pattern of the lighting device.

The mask thus retains a good surface appearance over time. Thus, the contrast between the regions of the translucent element not covered by the mask and the regions of the translucent element covered by the mask is high and provides an improved appearance to the lighting device.

The plurality of light-emitting diodes also promotes high contrast since the regions of the translucent element not covered by the mask and which form the pattern have substantially the same brightness.

According to different embodiments, the lighting device further comprises one or more of the following characteristics, taken in isolation or in any technically feasible combination:

the mask comprises at least one layer of paint applied to the internal surface of the translucent element, the mask comprises at least a first layer of colored paint applied to the internal surface of the translucent element and a second layer of opacifying paint applied to the first layer of colored paint, the device comprises a light-emitting diode control module connected to the electronic circuit and configured to control the switching on and off of each of the light-emitting diodes in groups or independently of each other, the translucent element is made of polycarbonate, the device comprises a protective coating layer fixed to the external surface of the translucent element, the device comprises a light homogenization device disposed between the light source and the mask, each light-emitting diode is aligned respectively with a through opening.

According to a second aspect, the invention also relates to a method of manufacturing a lighting device for a vehicle, the method comprising at least the following steps:

providing a translucent element, the translucent element defining an external surface and an internal surface, providing a light source comprising at least one electronic circuit comprising a plurality of light-emitting diodes, applying a mask to the internal surface of the translucent element, defining at least one through opening in the mask, disposing the light-emitting diodes facing the internal surface of the mask.

According to different embodiments, the method further comprises one or more of the following characteristics, taken in isolation or in any technically feasible combination:

the mask application step comprises applying at least one coat of paint to the internal surface of the translucent element, the step of defining the through opening is carried out using laser radiation.

BRIEF DESCRIPTION OF THE DRAWINGS

Other aspects and advantages of the invention will become apparent upon reading the following description, given by way of example and not limiting, and made with reference to the accompanying drawings, among which.

DETAILED DESCRIPTION OF EMBODIMENTS

Figure 1:
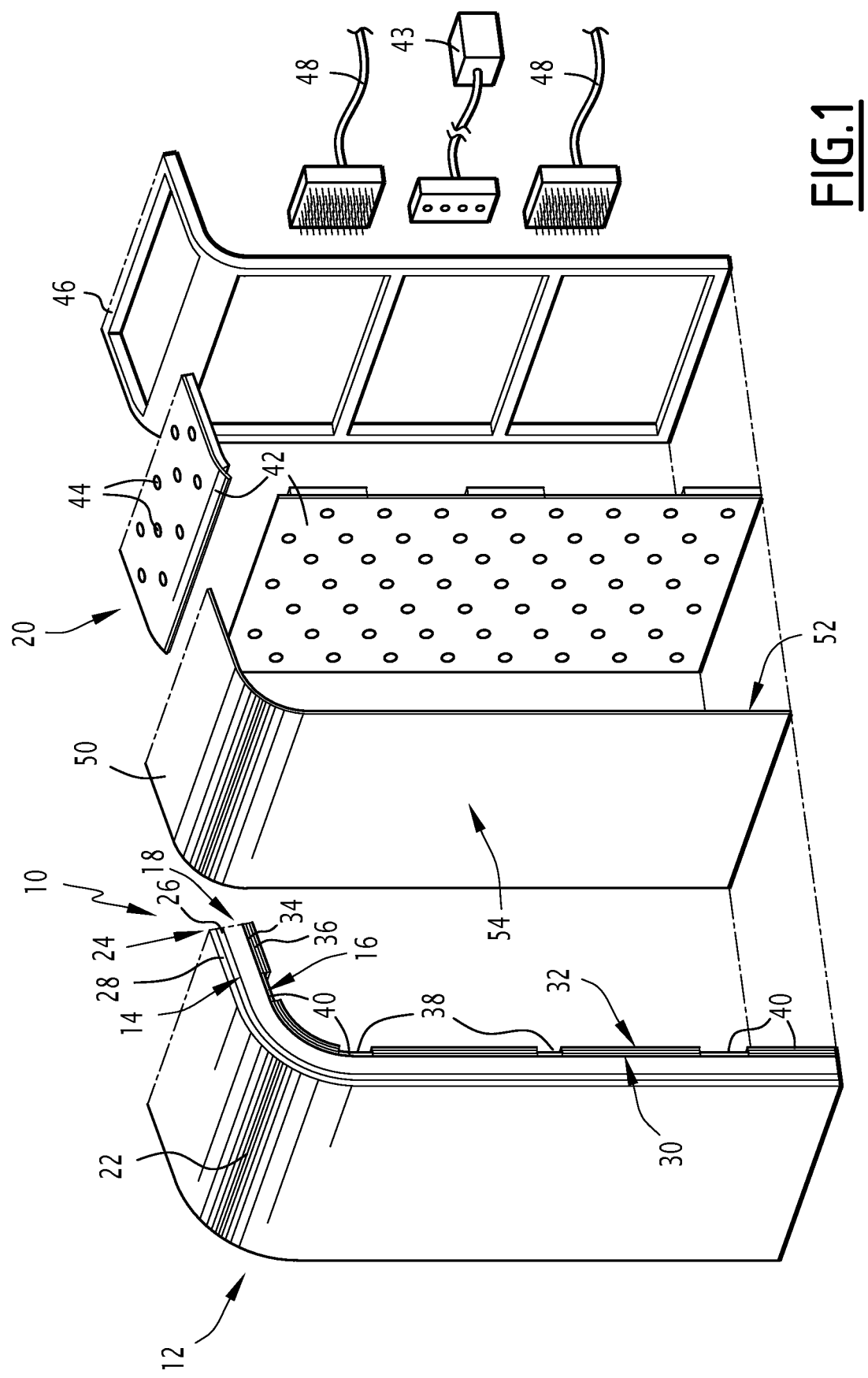
FIG. 1 is an exploded schematic view of a lighting device according to the invention.

FIG. 1 shows an exploded schematic view of a lighting device 10 for a vehicle according to the invention.

In the following description, the terms "internal" and "external" are understood relative to the vehicle on which the lighting device 10 is fixed. The term "external" is understood to be meant as being relatively more distant from the vehicle and qualifies as that that is turned towards the outside of the lighting device 10. The term "internal" is understood to be relatively closer to the vehicle and qualifies as that that is turned towards the inside of the lighting device 10.

The term "translucent" refers to a body that transmits light, i.e. having a light transmission rate of between 5% and 100%.

The term "transparent" is said of a body transmitting light by refraction and through which objects are clearly visible, i.e. a body having a light transmission rate greater than 90%, for example close to or equal to 100%.

The term "opaque" refers to a body that lets little or no light pass through, i.e. an object with a light transmission rate of less than 5%, or even close to or equal to 0%.

Light is considered in the visible range, i.e. composed of electromagnetic waves whose wavelength is generally between 380 nm and 780 nm.

The lighting device 10 is for example a lighting and/or signaling device.

The vehicle is for example a motor vehicle, such as a car, a truck, a bus or the like.

The lighting device 10 comprises a translucent element 12 defining an external surface 14 and an internal surface 16, a mask 18 fixed to the internal surface 16 of the translucent element 12, and a light source 20 disposed facing the mask 18.

The translucent element 12 is also called "lamp glass".

The external surface 14 of the translucent element 12 is intended to be exposed to the environment outside the vehicle.

The external surface 14 and the internal surface 16 of the translucent element 12 are substantially parallel to each other locally. In other words, the thickness of the translucent element 12 is substantially constant.

The thickness of the translucent element 12 is for example between 2 mm and 5 mm.

Advantageously, the thickness of the translucent element 12 is between 2 mm and 3 mm, for example 2 mm.

This makes it possible to limit the optical deformation of the light pattern created by the mask 18 through the translucent element 12.

In the example of FIG. 1, the external 14 and internal 16 surfaces comprise at least one curved region 22, for example convex and oriented outwards of the lighting device 10.

The translucent element 12 is preferably made of plastic material.

Advantageously, the translucent element 12 is made of polycarbonate.

This makes it possible to obtain a translucent element having a high transmission rate, greater than 90%, i.e. a transparent element 12.

Using a transparent element 12 makes it possible to obtain a lighting device 10 with a powerful light intensity while limiting power consumption.

In addition, polycarbonate offers very good mechanical strength, good sealing properties, and appearance.

Advantageously, the lighting device 10 comprises at least one protective coating layer 24 fixed to the external surface 14 of the translucent element 12.

The protective coating layer 24 makes it possible to protect the external surface 14 of the translucent element 12 against scratches, abrasion, impacts, ultra-violet rays, chemicals present in the surrounding air, yellowing, inclement weather, etc.

The protective coating layer 24 has, for example, a thickness of between 5 μm and 30 μm, for example 10 μm.

For example, the protective coating layer 24 comprises a primer layer 26 fixed to the eternal surface 14 of the translucent member 12 and a varnish layer 28 fixed to the primer layer 26.

The primer layer 26 offers better fixation of the varnish layer 28.

Preferably, the varnish layer 28 comprises a modified siloxane resin.

The mask 18 comprises an external surface 30 fixed to the internal surface 16 of the translucent element 12, and an internal surface 32.

Preferably, the mask 18 comprises at least one layer of paint 34, 36 applied to the internal surface 16 of the translucent element 12.

Figure 2:
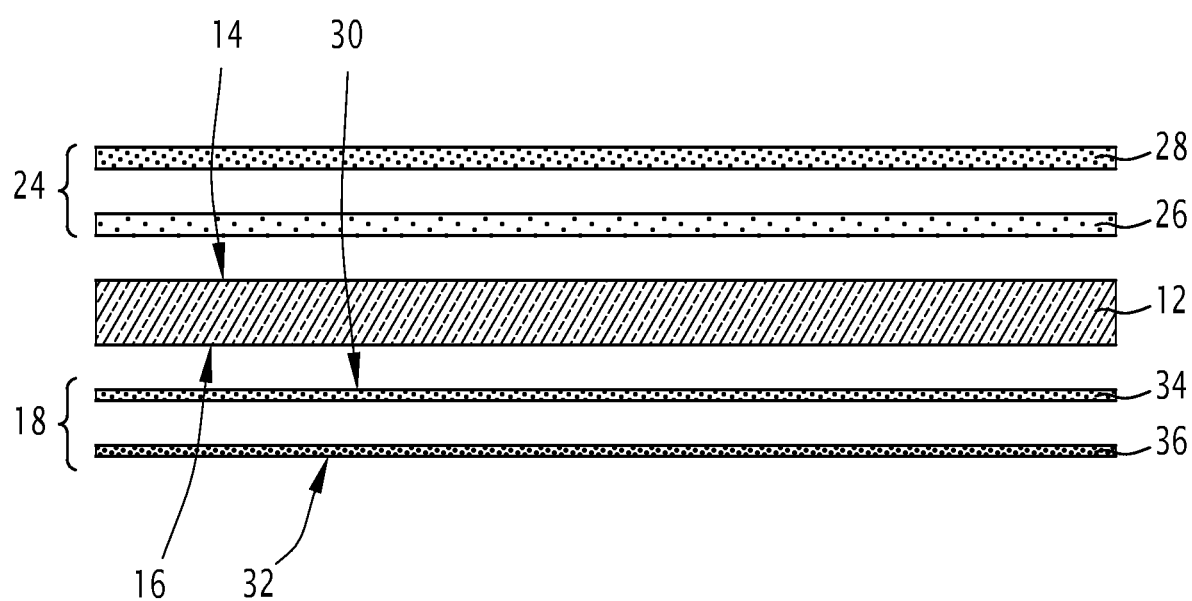
FIGS. 2 and 3 are schematic sectional views of the translucent element of the device of FIG. 1 during two steps of the manufacture of the device.
Figure 3:
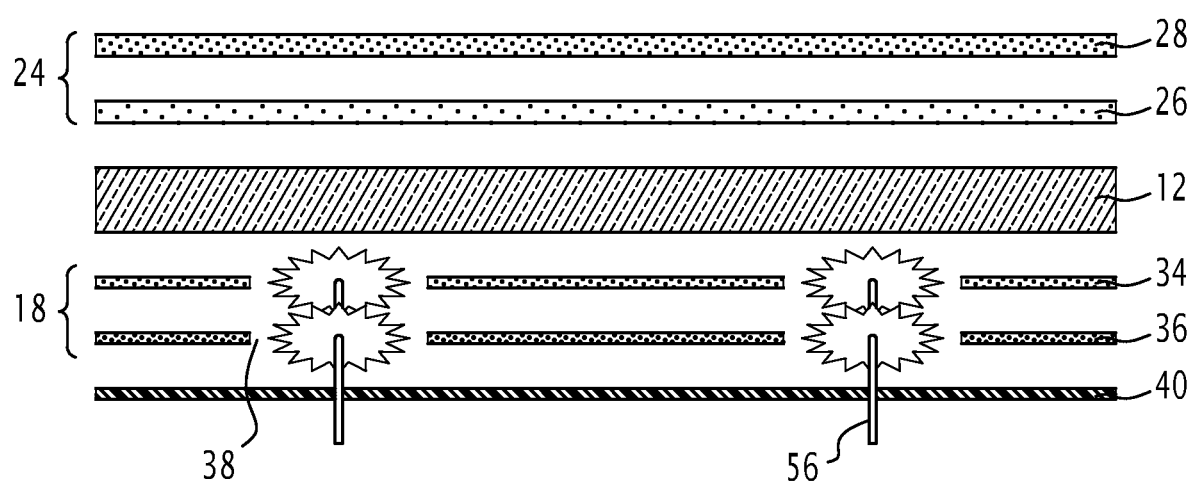

Advantageously, as visible in FIGS. 1 to 3, the mask 18 comprises a first layer of colored paint 34 applied to the internal surface 16 of the translucent element 12 and a second layer of opacifying paint 36 applied to the first layer of colored paint 34.

The first layer of paint 34 has a thickness of between 5 μm and 30 μm, for example 12 μm.

The second layer of paint 36 has a thickness between 5 μm and 40 μm, for example 20 μm.

Thus, the mask 18 has a thickness of between 10 μm and 70 μm, for example 30 μm.

The color of the first layer of paint 34 corresponds for example substantially to the color of the body of the vehicle or of an element of the body of the vehicle, for example adjacent to the lighting device 10 such as a bumper or a rear view mirror.

It corresponds to the color of the mask 18 as seen by the user observing the lighting device 10 from outside the vehicle and more generally to the color of the lighting device 10 seen from outside the vehicle when the light source 20 is off.

Thus, an assembly is obtained comprising a vehicle body element and a lighting device 10 in which the body element and the first layer of paint 34 have the same color.

The first paint layer 34 comprises for example a pigmentation or a compound giving a metallic or pearlescent effect.

The second layer of opacifying paint 36 ensures that the region of the internal surface 16 of the translucent element covered by the mask 18 is opaque and that there is no light leakage.

This further improves the contrast between the regions of the internal surface 16 of the translucent element 12 covered by the mask 18 through which there is no light transmission, and the regions of the internal surface 16 of the translucent element 12 which are not covered by the mask 18 through which light from the light source 20 is transmitted through the translucent element 12.

In addition, the second layer of opacifying paint 36 makes it possible to protect the first layer of paint 34 because it is resistant to the environment and thus contributes to obtaining quality masking which offers good resistance over time.

The mask 18 defines a plurality of through openings 38. Through openings 38 are regions of the internal surface 16 of the translucent element 12 which are not covered by the mask 18 and where light from the light source 20 passes through the translucent element 12.

The plurality of through openings 38 form, for example, a geometric pattern and/or a symbol and/or a text and/or a design such as a brand logo.

Advantageously, the lighting device 10 comprises an anti-fog coating layer 40 applied to the innermost paint layer, i.e. to the second paint layer 36 in the embodiment of FIG. 1 and to the interior of the through openings 38 on the internal surface 16 of the translucent element 12 on the regions of the internal surface 16 not covered by the mask 18.

The anti-fog coating layer 40 prevents the formation of water condensation in the form of droplets on the internal surface 32 of the mask 18 and in the through openings 38 on the internal surface 16 of the translucent element 12.

The light source 20 comprises at least one electronic circuit 42 comprising a plurality of light-emitting diodes 44.

In the example of FIG. 1, the light source 20 comprises two electronic circuits 42 arranged on either side of the curvature 22 of the translucent element 12.

For example, each electronic circuit 42 comprises between 10 and 100 light-emitting diodes 44.

The light-emitting diodes 44 are for example distributed evenly over the electronic circuit 42 and at a sufficient distance so as to cover the through openings 38 of the mask 18 with homogeneous light.

The light-emitting diodes 44 are arranged opposite the internal surface 32 of the mask 18.

For example, each of the light-emitting diodes 44 is arranged opposite a through opening 38 of the mask 18.

For example, all the light-emitting diodes 44 are of the same nature and emit light having the same characteristics (intensity and wavelength for example).

Alternatively, the light-emitting diodes 44 emit distinct lights (intensity and/or wavelength for example).

Preferably, the lighting device 10 comprises a frame 46 on which the electronic circuits 42 are fixed, and at least one power supply device 48 connected to the electronic circuits 42 to supply energy to the electronic circuits 42.

Advantageously, the lighting device 10 comprises a control module 43 of the light-emitting diodes 44 connected to the electronic circuit 42.

The light-emitting diode control module 43 makes it possible to control the switching on of each of the light-emitting diodes 44 independently of each other, for example for a predetermined time.

As a variant or in addition, the control module 43 makes it possible to control the switching on of the light-emitting diodes 44 by groups of diodes 44.

As a variant or in addition, the control module 43 makes it possible to control the switching on of all the light-emitting diodes 44.

Thus, the light-emitting diodes 44 may be for example turned on successively in a particular order, for example in a particular direction, to form a light animation.

The light animation corresponds to the turning on of at least one light-emitting diode 44 while other light-emitting diodes 44 are off, then to the turning on of other light-emitting diodes 44 while the light-emitting diode(s) 44 are still on or off, then on the turning off of light-emitting diodes 44 while other light-emitting diodes 44 are on.

This makes it possible to create a movement of propagation of light from one region to another of the external surface 14 of the translucent element 12.

Advantageously, the lighting device 10 comprises at least one light homogenization device 50 disposed between the mask 18 and the light source 20.

The light homogenization device 50 comprises an internal surface 52 oriented towards the light source 20 and an external surface 54 oriented towards the mask 18.

The light homogenization device 50 changes the trajectory of the incident light rays. The incident light rays from the light source 20 reach the internal surface 52 of the light homogenization device 50 at a plurality of angles of incidence.

The light homogenizer 50 changes the direction of the light rays so that the emerging rays all have propagation directions that are substantially parallel to each other.

Preferably, the emerging rays have a direction of propagation substantially perpendicular to the internal surface 16 of the translucent element 12.

The light homogenization device 50 makes it possible to obtain a homogeneous light beam through the translucent element 12. Thus, the light intensity of the regions of the translucent element 12 which are not covered by the mask 18 is substantially the same.

The light homogenization device 50 comprises, for example, a first internal lenticular film and a second external lenticular film disposed opposite the first lenticular film.

The first lenticular film is designed to change the direction of the incident light rays in a direction substantially parallel to the internal surface 16 of the translucent element 12.

The second lenticular film is designed to change the direction of the light rays exiting the first lenticular film in a direction substantially perpendicular to the internal surface 16 of the translucent element 12.

Advantageously and alternatively, the light homogenization device 50 comprises a single lenticular film designed to change the direction of light rays incident on its internal surface, and to change light rays in another direction on its external surface.

Such a lenticular film is for example described in patent application EP 3 298 455 A1.

A method of manufacturing a lighting device 10 as described above will now be described with reference to FIGS. 2 and 3.

The method first comprises providing the translucent element 12.

The translucent element 12 is for example made by injection into a mold.

Preferably, the translucent element 12 is made by injection of polycarbonate to obtain a transparent element.

The method then comprises applying the mask 18 to the internal surface 16 of the translucent element 12.

For example, the step of applying the mask 18 comprises applying at least one coat of paint 34, 36 to the internal surface 16 of the translucent element 12.

More specifically, in the example of FIGS. 1 to 3, the method comprises applying a first layer of colored paint 34 to the internal surface 16 of the translucent element 12.

The method then comprises applying a second layer of opacifying paint 36 over the first layer of paint 34.

The step of defining the mask 18 is advantageously carried out using laser radiation 56 (FIG. 3).

The laser radiation 56 makes it possible to strip a portion of the first layer of paint 34 and of the second layer of paint 36 present on the internal surface 16 of the translucent element 12 and thus to define at least one through opening 38 in the mask 18.

For example, the through opening 38 has a minimum dimension of 0.2 mm on the internal surface 16 of the translucent element 12.

The laser radiation 56 makes it possible to define a mask 18 having a precise geometric pattern comprising, for example, curved regions.

Preferably, before the application of the mask 18, the external surface 14 of the translucent element 12 is covered by at least one protective coating layer 24.

For example, the external surface 14 of the translucent element 12 is covered with a layer of primer 26 by spraying, then a layer of varnish 28 by spraying.

The translucent element 12 covered with the primer layer 26 and the varnish layer 28 is then, for example, heat treated to harden the varnish layer 28 and improve the adhesion of the layers 26, 28 on the external surface 14 of the translucent element 12.

Advantageously, the method comprises applying an anti-fog coating layer 40 to the regions of the internal surface 16 of the translucent element 12 not covered by the mask 18. The anti-fog coating layer may also cover all or part of the second coat of paint 36.

The lighting device 10 is then assembled as shown in FIG. 1.

The translucent element 12 is disposed opposite the light source 20.

More particularly, the electronic circuits 42 are fixed to the frame 46 and the translucent element 12 comprising the mask 18 is disposed opposite the electronic circuits 42.

Preferably, a light homogenization device 50 is disposed between the light source 20 and the translucent element 12.

The assembly is for example fixed in a housing (not shown).

The lighting device 10 is then fixed to the vehicle.

The invention claimed is:

1. A lighting device for a vehicle, the lighting device comprising:
   a translucent element defining an external surface and an internal surface,
   a mask defining an external surface and an internal surface, the mask defining a plurality of through openings, and
   a light source comprising at least one electronic circuit comprising a plurality of light-emitting diodes,
   wherein the external surface of the mask is fixed on the internal surface of the translucent element, the light-emitting diodes of the light source being disposed facing the internal surface of the mask, the mask comprising at least a first layer of colored paint applied to the internal surface of the translucent element and a second layer of opacifying paint applied to the first layer of colored paint.

2. The lighting device according to claim 1, comprising a control module of the light-emitting diodes connected to the electronic circuit and configured to control the switching on and off of each of the light-emitting diodes in groups or independently of each other.

3. The lighting device according to claim 1, wherein the translucent element is made of polycarbonate.

4. The lighting device according to claim 1, further comprising at least one protective coating layer fixed to the external surface of the translucent element.

5. The lighting device according to claim 1, further comprising at least one light homogenization device disposed between the light source and the mask, the at least one light homogenization device covering the plurality of through openings.

6. The light device of claim 5, wherein the light homogenization device comprises an internal surface oriented towards the light source and an external surface oriented towards the mask, the homogenization device being configured to modify the direction of a light ray hitting the internal surface so that the direction of said light ray emerging from the external surface is perpendicular to the internal surface of the translucent element.

7. The lighting device of claim 1, wherein the plurality of light-emitting diodes are distributed evenly over the electronic circuit.

8. The lighting device of claim 1, wherein the plurality of light-emitting diodes are arranged over the electronic circuit to cover the plurality of through openings with homogenous light.

9. The lighting device of claim 1, further comprising an anti-fog coating layer applied to the second layer of opacifying paint and applied to an interior of the plurality of through openings.

10. A method of manufacturing a lighting device for a vehicle, the method comprising at least the following steps:
    providing a translucent element, the translucent element defining an external surface and an internal surface,
    providing a light source comprising at least one electronic circuit comprising a plurality of light-emitting diodes,
    applying a mask on the internal surface of the translucent element,
    defining at least one through opening in the mask, and
    disposing the light-emitting diodes facing the internal surface of the mask,
    wherein the mask comprises at least a first layer of colored paint applied to the internal surface of the translucent element and a second layer of opacifying paint applied to the first layer of colored paint.

11. The method according to claim 10, wherein the step of applying the mask comprises applying at least one coat of paint to the internal surface of the translucent element.

12. The method according to claim 10, wherein the step of defining the through opening is performed using laser radiation.

13. A lighting device for a vehicle, the lighting device comprising:
    a translucent element defining an external surface and an internal surface,
    a mask defining an external surface and an internal surface, the mask defining a plurality of through openings, and
    a light source comprising at least one electronic circuit comprising a plurality of light-emitting diodes,
    at least one light homogenization device disposed between the light source and the mask, the at least one light homogenization device covering the plurality of through openings,
    wherein the external surface of the mask is fixed on the internal surface of the translucent element, the light-emitting diodes of the light source being disposed facing the internal surface of the mask.

* * * * *